(12) United States Patent
Jacobsen et al.

(10) Patent No.: US 9,436,437 B2
(45) Date of Patent: Sep. 6, 2016

(54) CREATION, EDITING AND NAVIGATION OF DIAGRAMS

(75) Inventors: Jens K. Jacobsen, Seattle, WA (US); Sadi Khan, Redmond, WA (US); Gareth Alun Jones, Issaquah, WA (US); Tyler Edward Gibson, Seattle, WA (US); Steven Douglas De Mar, Redmond, WA (US); Andrew Jude Byrne, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 410 days.

(21) Appl. No.: 12/972,060

(22) Filed: Dec. 17, 2010

(65) Prior Publication Data

US 2012/0154283 A1 Jun. 21, 2012

(51) Int. Cl.
*G06F 17/30* (2006.01)
*G06F 9/44* (2006.01)

(52) U.S. Cl.
CPC .............. *G06F 8/10* (2013.01); *G06F 9/4446* (2013.01)

(58) Field of Classification Search
CPC ................................................ G06F 17/30734
USPC ........................................................ 707/609
See application file for complete search history.

(56) References Cited

U.S. PATENT DOCUMENTS

| | | | |
|---|---|---|---|
| 4,656,603 A | 4/1987 | Dunn | |
| 6,556,878 B1 | 4/2003 | Fielding | |
| 6,970,844 B1 | 11/2005 | Bierenbaum | |
| 7,420,573 B1 * | 9/2008 | Aberg et al. | 345/630 |
| 8,046,735 B1 * | 10/2011 | Singh et al. | 717/105 |
| RE43,905 E * | 1/2013 | Bierenbaum | 705/39 |
| 2005/0289526 A1 | 12/2005 | Wang et al. | |
| 2006/0266250 A1 | 11/2006 | Stallo | |
| 2008/0092109 A1 | 4/2008 | Kinnucan et al. | |
| 2008/0092111 A1 | 4/2008 | Kinnucan et al. | |
| 2008/0109235 A1 * | 5/2008 | Binnie et al. | 705/1 |
| 2008/0288916 A1 | 11/2008 | Tazo et al. | |
| 2009/0199123 A1 | 8/2009 | Albertson et al. | |

(Continued)

FOREIGN PATENT DOCUMENTS

| | | |
|---|---|---|
| CN | 101118492 A | 2/2008 |
| CN | 101281522 A | 10/2008 |
| CN | 100517304 C | 7/2009 |

OTHER PUBLICATIONS http://web.archive.org/web/20060111060231/http://www.smartdraw.com.*

(Continued)

*Primary Examiner* — Alexey Shmatov
*Assistant Examiner* — Matthew Ellis
(74) *Attorney, Agent, or Firm* — Kevin Sullivan; Sergey Lamansky; Micky Minhas

(57) ABSTRACT

Organizing data where the data has spatial significance. A method includes, at a user interface, displaying to a user a representation of spatially structured data. User input is received at a computer implemented user interface through one or more hardware user interface devices. The user input is domain agnostic, but has a spatial connotation. Based on pre-existing structured data displayed at the user interface, a domain is determined for the user input. Based on the determined domain, the user input is interpreted into a domain specific response. The domain specific response is consistent with the spatial connotation across a plurality of domains.

20 Claims, 9 Drawing Sheets

(56) References Cited

U.S. PATENT DOCUMENTS

2010/0058161 A1     3/2010   Coldicott
2010/0251211 A1     9/2010   Dutta

OTHER PUBLICATIONS http://web.archive.org/web/20091029160326/http://www.lucidchart.com/.*
http://web.archive.org/web/20091003024551/http://www.smartdraw.com/product/features/Basics.*
http://web.archive.org/web/20090924044625/http://www.smartdraw.com/product/features/Network-Diagram-Automation.*
Apr. 3, 2004, http://www.sulfurcreek.com/classes/smartdraw/sdch03.htm.*
Brian Friedlander, Sep. 14, 2009, http://assistivetek.blogspot.com/2009/09/smartdraw-2010-project-management.html#!/2009/09/smartdraw-2010-project-management.html.*
ConceptDraw, Feb. 1, 2001, http://www.conceptdraw.com/How-To-Guide/process-flowcharts.*
ConceptDraw, Jul. 8, 2010, http://www.conceptdraw.com/How-To-Guide/uml-class-diagram-notation.*
Microsoft Windows Client.net, "Setting Up Visual Studio for WPF and Silverlight Development," Oct. 2010, http://windowsclient.net/wpfdesigner/articles/visual-studio-setup.aspx.
Sparx Systems, "Enterprise Architect 7.5," Oct. 2010, http://www.sparxsystems.com/products/ea/7.5/Sp.
User Interface Management Systems: The CLIM Perspective, Jun. 2008, http://www.sts.tu-harburg.de/~r.f.moeller/uims-clim/clim-intro.html.
yWorks, yFiles WPF Release Notes, Oct. 2010, http://www.yworks.com/en/products_yfileswpf_relnotes.html.
WPF Architecture, May 2008, http://msdn.microsoft.com/en-us/library/ms750441.aspx.
Sorens, "Taming Sandcastle: A .NET Programmer's Guide to Documenting Your Code," Sep. 2010, http://www.simple-talk.com/dotnet/.net-tools/taming-sandcastle-a-.net-programmers-guide-to-documenting-your-code/.
"Extended Search Report Received for European Patent Application No. 11849883.1", Mailed Date: Jun. 11, 2014, 6 Pages.
"Office Action & Search Report Received for Chinese Patent Application No. 201110427832.8", Mailed Date: Jan. 6, 2014, 13 Pages.
"Office Action & Search Report Received for Chinese Patent Application No. 201110427832.8", Mailed Date: Sep. 17, 2014, 15 Pages.
"Third Office Action Issued in China Patent Application No. 201110427832.8", Mailed Date: Mar. 27, 2015, 8 Pages.
"Office Action Issued in Chinese Patent Application No. 201110427832.8", Mailed Date: Oct. 10, 2015, 7 Pages.
"Office Action Issued for Japanese Patent Application No. 2013-544854", Mailed date: Feb. 15, 2016, 7 Pages.

* cited by examiner

| Diagram | Selected Object | Commands | | | | |
|---|---|---|---|---|---|---|
| | | Create New Below | Create New To The Left | Create New To The Right | Create New Above | Create New Inside |
| | Example Keyboard Gestures | Enter | Ctrl-L | Ctrl-R | Ctrl-U | Ctrl-N |
| Class | Class | Create Inherited Class Below Current Class (Class Plus Directed Generalization Relationship) | Create Associated Class To The Left | Create Associated Class To The Right | Create Super Class Above Current Class (Class Plus Directed Generalization Relationship) | Set Focus On Compartment, Ready To Add Members |
| Activity | Action | Create Action Below, With Flow | Create Action To The Left, With Flow | Create Action To The Right, With Flow | Create Action Above, With Flow | |
| Sequence | Life Line (Or Message) | Start Message From This Lifeline | Create Lifeline To The Left | Create Lifeline To The Right | Insert Message Above Current Message | |
| Layer | Layer | New Layer Below | New Layer To The Left | New Layer To The Right | New Layer Above | New Layer Contained In The Current One |
| Component Diagram | Component | New Component Below | New Component To The Left | New Component To The Right | New Component Above | New Part Inside The Component |

*Figure 1*

CREATION, EDITING AND NAVIGATION OF DIAGRAMS

BACKGROUND

Background and Relevant Art

Computers and computing systems have affected nearly every aspect of modern living. Computers are generally involved in work, recreation, healthcare, transportation, entertainment, household management, etc.

Many computers are intended to be used by direct user interaction with the computer. As such, computers have input hardware and software user interfaces to facilitate user interaction. For example, a modern general purpose computer may include a keyboard, mouse, touchpad, camera, etc. for allowing a user to input data into the computer. In addition, various software user interfaces may be available.

Examples of software user interfaces include graphical user interfaces, text command line based user interface, function key or hot key user interfaces, and the like.

It is often slow and cumbersome to create system architectural diagrams using existing or current tools. To create content, users have to constantly switch between the mouse (e.g. to create nodes and links, etc.), the keyboard (e.g. to name the nodes and link, to add members to nodes, etc) and back to the mouse again (e.g. to fine tune position of nodes and links with respect to other nodes and links in the diagram or to rearrange multiple nodes and links to accommodate the addition of new nodes and/or links). For a developer, this may result in constant interruption of mental flow as the developer attempts to explore a design.

To counter this constant mode switching, systems may include keyboard shortcuts to create nodes and links. However, traditional systems make this impractical. First, in complex domains such as UML, the sheer number of types involved makes it difficult to create, not to mention remember meaningful keyboard shortcuts for all of the types. Second, the layout does matter in architectural diagrams, so fully automatic layouts are often impractical. Traditional systems solve this by giving users very fine grained control over the positioning of nodes and links. However, in most cases users want to think about layout in a broad sense, using clear relationships, such as "above/below", "grouped with" and "next to" to communicate meaning. The functionality for the user to fine tune the detailed layout is only marginally useful for this, and is one of the causes of the constant mode switching in current systems. Further, there is evidence that this is seen as an adoption blocker for people who want to move from hand drawn whiteboarding to a more sophisticated computer implemented diagramming solution.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method practiced in a computing environment. The method includes acts for organizing data where the data has spatial significance. The method includes, at a user interface, displaying to a user a representation of spatially structured data. User input is received at a computer implemented user interface through one or more hardware user interface devices. The user input is domain agnostic, but has a spatial connotation. Based on pre-existing structured data displayed at the user interface, or previous user actions, a domain is determined for the user input. Based on the determined domain, the user input is interpreted into a domain specific response. The domain specific response is consistent with spatial connotation across a plurality of domains.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 1 illustrates a table of various gestures, commands, and diagram domains;

DETAILED DESCRIPTION

Figure 2A:
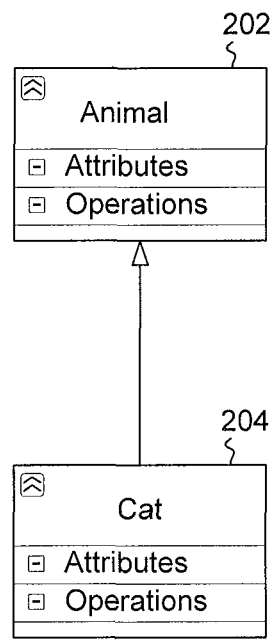
FIG. 2A illustrates a class diagram.

Some embodiments may use a combination of smarter keyboard shortcuts, semi-automatic layout and automatically constrained guidance hints based on domain and/or context to allow a user to stay in the flow of creating diagrams without having to interrupt their work to deal with detailed layout. One embodiment system may implement a combination of commands to give users a consistent way of placing new nodes in semantically significant positions, such as above, below or inside the current node, without burdening them with managing the pixel by pixel layout. This is combined with directed context and/or domain specific constrained guidance, such as IntelliSense, to set element types while entering names or signatures, resulting in a system that lets the user stay in the flow of creating diagrams without having to interrupt their work to deal with detailed layout. Additionally or alternatively, embodiments may include the ability to easily navigate diagrams via their links.

Some embodiments implement functionality where standard directional commands, accessible through various gestures, can be used to create elements in a diagram or other spatially structured data above, below, left, right or inside of the current element. The directional commands stay the same, regardless of domain, because the directions associated with the commands are universally meaningful, and can be combined with domain knowledge to determine for example which type of element is created by default.

Some embodiments may be applied to diagrams and/or other spatially structured data. As noted, embodiments may be used, for example, to create a system architectural blueprint using UML diagrams. Embodiments may be used for flowchart diagrams. In particular, embodiments can be used to place nodes and connectors in diagrams. Embodiments may be used for physical object spatial layout. For example, embodiments may be used to illustrate physical objects with respect to other existing physical objects. Embodiments may be used for database or other tables. For example, embodiments may be used to define database object dependencies or relationships.

As noted, embodiments may use various gestures, where the gestures are the same regardless of domain. For example, some gestures may be implemented using keyboard gestures. Example keyboard gestures may include "Enter" to create a new node or object below an in focus entity; "Ctrl-L" to create a new object to the left of an in focus entity; "Ctrl-R" to create a new object to the right of an in focus entity; "Ctrl-U" to create a new object above an in focus entity; and "Ctrl-N" to create an object inside of an in focus entity. Notably, the keyboard gestures (or other gestures as noted below) will generate different results in different domains, albeit with a similar sense of "direction". For example in designing the electrical circuit layout of an automobile case, Ctrl+U might add circuitry in with orthogonal layout for the front headlights of the car, while Ctrl+U in the case of a UML Class diagram might add the base class. In both cases diagram elements would be aligned appropriately. One commonality is that embodiments take the implication of direction, apply it to a specific domain, and alleviating the user from having to make pixel by pixel changes.

In alternative embodiments, mouse gestures, where the gestures are the same regardless of domain, may be used. Example mouse gestures may include a downward mouse flick to create a new node or object below an in focus entity; a left mouse flick to create a new object to the left of an in focus entity; a right mouse flick to create a new object to the right of an in focus entity; an upward mouse flick to create a new object above an in focus entity; and an approximately circular movement about the entity to create an object inside of an in focus entity.

In alternative embodiments, touchpad or touch screen gestures, where the gestures are the same regardless of domain, may be used. Example touchpad or touch screen gestures may include a downward touchpad or touch screen flick to create a new node or object below an in focus entity; a left touchpad or touch screen flick to create a new object to the left of an in focus entity; a right touchpad or touch screen flick to create a new object to the right of an in focus entity; an upward touchpad or touch screen flick to create a new object above an in focus entity; and an approximately circular movement about the entity to create an object inside of an in focus entity.

In alternative embodiments, human body tracked gestures, where the gestures are the same regardless of domain, may be used. For example, various tools exist for tracking arm movements, such as the use of handheld controllers that can be tracked by a computing system. Gestures may be based on movement of a controller as sensed by an accelerometer and/or controller tracking device, such as an infrared movement tracker.

Alternatively, other computing systems can use cameras to recognize human limbs and extremities and to track their movements. Example limb or extremity movement gestures may include a downward limb or extremity movement flick to create a new node or object below an in focus entity; a left limb or extremity movement flick to create a new object to the left of an in focus entity; a right limb or extremity movement flick to create a new object to the right of an in focus entity; an upward touchpad or touch screen flick to create a new object above an in focus entity; and an approximately circular limb or extremity movement about the entity to create an object inside of an in focus entity.

Gestures may be based on movement of a computing device as sensed by an accelerometer in the computing device. For example, many tablet computing devices include an accelerometer to measure speed and direction of movement about two or more axis. A sudden tilt of the top of the tablet upward followed by tilting the tablet back to a level position may be used to create a new node or object below an in focus entity; a sudden left tilt followed by a leveling may be used to create a new object to the left of an in focus entity; a sudden right tilt followed by a leveling may be used to create a new object to the right of an in focus entity; a sudden downward tilt of the top of the tablet followed by leveling may be used to create an object above an in focus entity; and shaking or somewhat circular movements of the tablet may be used to create an object inside of an in focus entity.

Still other embodiments may use voice commands for object creation. For example, in one non-limiting example, example voice commands may include "Down" to create a new node or object below an in focus entity; "Left" to create a new object to the left of an in focus entity; "Right" to create a new object to the right of an in focus entity; "Up" to create a new object above an in focus entity; and "Add" to create an object inside of an in focus entity.

As noted previously, commands can be invoked in a number of ways. Inasmuch as the commands center around location and direction, systems that allow mouse, pen, touch, multi-touch or other command modes where commands can easily be mapped to appropriate gestures, these command modes lend themselves well to creating natural gestures that can cross domains. For example, a user might use a finger to make an upwards flick from a shape to create a related shape above it, or indeed just gesture to draw a node at a location roughly above the active one.

As noted previously, embodiments may use domain independent commands or gestures and apply them in a domain specific way. For example, referring to FIG. 1, a table 100 is shown that illustrates different types of diagrams, entities that may be selected within a diagram, keyboard gestures that are independent of domain, and the results of using the given keyboard gesture given a particular diagram and selection.

Figure 2B:
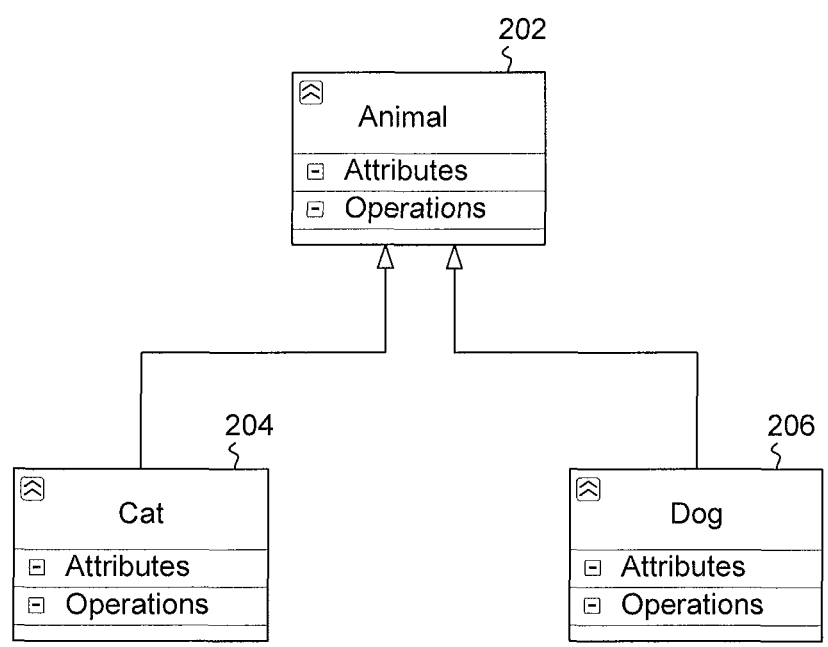
FIG. 2B illustrates adding an inherited class to a class diagram.

Embodiments may further include functionality for semi-automatic layout which fine tunes the alignment and spacing of elements as they are created, resolving any conflicts that may arise. Users may then freely change layout manually, but the system may greatly reduce the need to do so. Referring now to FIG. 2, an example of this functionality is illustrated. FIG. 2A illustrates an "Animal" class 202. An inherited "Cat" class 204 is related to the Animal class 202 through an "IS-A" relationship. A user may wish to create a "Dog" inherited class below the Animal class 202. To do this, a user may select the Animal class 202 bringing the Animal class 202 into focus. As illustrated in FIG. 2B, the user may then perform a gesture to create a new class 206 below the Animal class 202, such as by pressing the "Enter" key which may be interpreted as a command to place a new object below a selected object. Thus, because of the domain of a Class diagram, and in the context of having selected the Animal class 202, a new inherited class 206 can be created below the Animal class 202. As illustrated in FIG. 2B, the Cat class 204 may be automatically shifted to make room for the new inherited class 206.

Embodiments may perform intelligent routing of edges to ensure that if certain shapes cannot be moved—or if the gesture itself is not a simple bump, but rather a complex set of shapes that need to be added, the edges connecting that set of shapes can be routed in a variety of ways with a variety of styles. For example, embodiments may implement spline routing, orthogonal routing etc.

Additionally, some embodiments may be implemented to perform an incremental layout. In particular, changes will occur incrementally and a minimalistic set of changes will be made to the graph. This can be done, in some embodiments, so that user perceives the layout to be fairly stable.

FIG. 2B show an example where the only user input was the use of a context independent command (i.e. pressing the Enter key) without any additional input specifying where objects should be moved, placed, or connected. Embodiments may allow for movement from the automatic movement later if a user so desires.

As illustrated in the above example, newly created elements may be given a type automatically, based on context. For example, in the example shown in FIGS. 2A and 2B, because the Animal class 204 was selected, the system knew that a gesture should be interpreted in the domain of a class diagram in the context of a class. Thus, pressing Enter caused an inherited class 206 to be created below the selected Animal class 202. This illustrates that, based on the domain, a new element would be of 'type' 'class'. Further, embodiments can infer the relationship between the original element and the new element, as well as add a link to illustrate that relationship is an additional one.

Various other features may be implemented in various embodiments as will be illustrated in more detail below. However a partial enumeration of such features includes allowing users to change the type of elements simply by adding a type to the name as they enter it from the keyboard; guided and bounded input hints such as IntelliSense or mnemonics to aid users in selecting types while entering names, link creation using guided and bounded input hints such as IntelliSense, and navigating diagrams via their links from the keyboard using a consistent scheme, similar to that of creating node. Embodiments may include functionality, using a custom database backend for code-specific domains, to enable intelligent use of gestures in the domain of code. For example, gestures can be used in indicated inheritance of classes, polymorphism between methods etc.

Various examples will now be illustrated. A first example illustrates the use of domain agnostic commands having a spatial context to create elements, supported by automatic type system and incremental layout. In this example, the context includes a user creating a diagram, including nodes and links. In this particular example a UML Activity diagram is illustrated, however even this example can be generalized to any node and link diagram.

Embodiments may include a set of standard commands, accessible from the keyboard, the mouse and/or from other gestures to create elements in semantically meaningful locations relative to a current selection. As examples, semantically meaningful locations may include but are not restricted to above, below, left, right or inside of a current element. Embodiments may include functionality for laying out a new element caused to be created by invocation of a command using a gesture relative to the source element (e.g. a selected or in focus element) and other existing elements. Embodiments may automatically assign a type to the element, driven by the domain and the specific context.

Embodiments may be implemented where the user commands stay the same regardless of domain, because the directions are universally meaningful, though not necessarily always the same in each domain. This way the user has a consistent way of performing similar tasks across a great number of domains. FIG. 1 as illustrated above illustrates where a standard set of commands and gestures can be used to perform similar tasks across different domains.

Figure 3A:
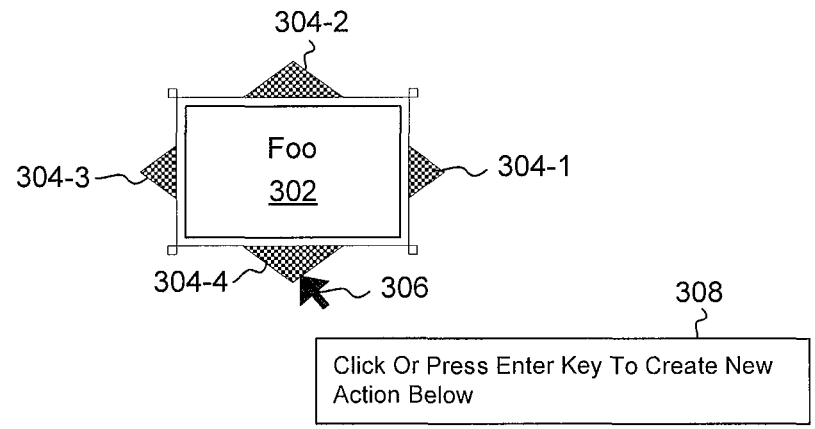
FIG. 3A illustrates an activity diagram.

FIG. 3A illustrates portions of one example scenario. In FIG. 3A, a user may create a node 302 using a regular toolbox. In the examples illustrated herein, a node may be a single node, a set of nodes, a container with a set of child nodes, a composite shape, such as a compartment shape, which is a class shape with rows for each method within it, combinations of the above, etc. The toolbox may include user interface elements presented to a user where the user can interact with hardware devices such a mice and keyboards to interact with the user interface. The user may be able to select, for example, diagram type and element type for the node 302. The user may now wish to create the next node in the flow, directly below the original node 302. FIG. 3A illustrates one user interface view that a user may be able to interact with. In the example illustrated, the user sees four controls 304-1, 304-2, 304-3, and 304-4 around the node, one pointing in each direction. In the example illustrated, the user hovers a mouse pointer 306 over the control 304-4 that points downward. A tool tip 308 tells the user that the user can use the Enter key instead of clicking on the control. In the present example, hovering over the control 304-1 may cause a tool tip to indicate to a user that a new action can be created by pressing "Ctrl-R". Hovering over the control 304-2 may cause a tool tip to indicate to a user that a new action can be created by pressing "Ctrl-U". Hovering over the control 304-3 may cause a tool tip to indicate to a user that a new action can be created by pressing "Ctrl-L". The user may not need to hover over the controls, but rather may already know what the gestures will do. Further, with other interfaces, such as touch screens, mice, motion sensing systems, etc, the tool tip may indicate different gestures that are dependent on the interface environment.

Figure 3B:
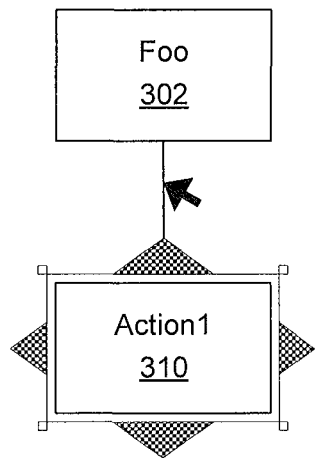
FIG. 3B illustrates adding an action to an activity diagram.

In the present example, a user presses Enter, and a new node 310 is created, with or without a connecting relationship as illustrated in FIG. 3B. What type of element and relationship gets created is derived from the type of diagram, the location the gesture started from, the node from which the gesture began, the direction of the command, and/or user preference and/or recent activity. In this example, the domain is an activity diagram, so the default element for the new node 310 is an action. Inasmuch as actions most often are connected by control flows, a control flow is created automatically. The control flow is pointing to the new element, since the most common flow direction in activity diagrams is down. In an alternate embodiment, one way of deciding on direction in this case might be that flow always goes from an existing node to the newly created node. Thus, embodiments may be implemented where default link direction is also determined by domain, selection, gesture etc.

In some embodiments, once a node or link is place, the user may be given a very easy way to change the direction or type of the link. For example, a user may be able to use or change smart tag etc.

In various embodiments, the automatic location of placement of the element node 310 may be dictated by various factors. For example, placement may be dictated by the direction of the command. Additional considerations for automatic alignment and spacing may be based on constraints in a layout engine which may be based on the diagram type and its domain and/or user preferences. User preference may be pre-specified in user settings. Alternatively, user preferences may be deduced based on past user interaction. Automatic layout can relieve the user from having to define layout manually. However, embodiments may include functionality that allows a user to further modify or "tweak" placement of elements placed using automatic layout.

Embodiments may have various novel features distinguishing them from previous systems. In particular, embodiments may implement a consistent set of commands and gestures that crosses content and diagram types. Embodiments may include an automatic system for determining which elements to create and their types, based on domain, target, direction, user preference etc. allowing the system to be consistent and useful across a number of domains. Embodiments may include automatic incremental layout, driven by domain specific constraints, which allows commands to give similar but domain specific results, depending on the type of diagram.

Illustrating now another example which illustrates other functionality, embodiments may implement a system to rapidly set type of element using prompts, constricted by the current domain. For example, a user may be designing a diagram. As the user uses commands and gestures, in some cases the user wants to change or further specify the type of element. Alternatively, as part of the design process, the user may discover that the type the user first created needs to be changed.

Embodiments may include functionality for executing a command to set the type of an element, based on the current context, and a set of novel entry points to this command. Some embodiments may implement a system that allows a user to specify the type of an element while typing in its name, using mnemonics or a constrained hinting module such as IntelliSense. Embodiments may be implemented where further gestures can be used to invoke this functionality, such as the mouse wheel or context menus.

Figure 4A:
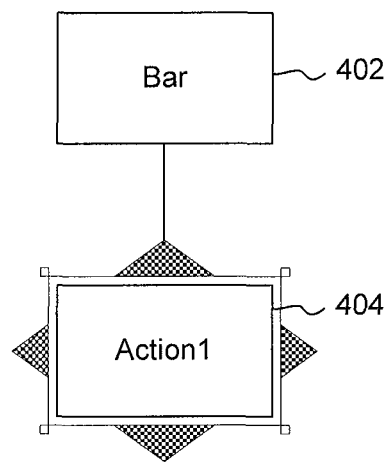
FIG. 4A illustrates an activity diagram.
Figure 4B:
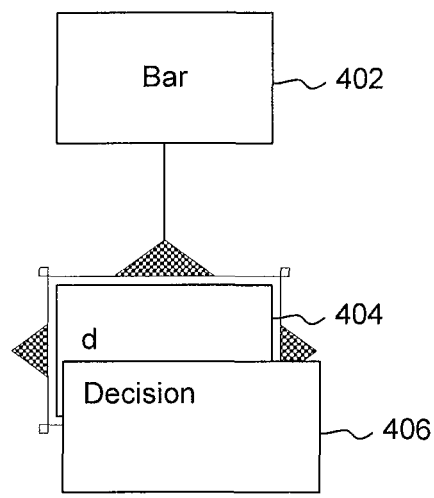
FIG. 4B illustrates portions of changing an element type in an activity diagram.

Referring now to FIG. 4A, an example is illustrated. The example illustrated in 4A shows that a user has created a new action node 404 below a current node 402 by interacting with input hardware to use the create below command. The user wants this node to be a decision shape. As illustrated in FIG. 4B, the user starts typing while the new action node is selected and/or in focus. A drop down 406 appears providing one or more domain constrained hints or suggestions. Inasmuch as the first letter the user typed was a 'd' the list is filtered down to the types available in this domain that start with a 'd'. As noted, the list of suggestions may be constrained based on domain. Thus, in this example, only suggestions appropriate for the particular domain shown in FIGS. 4A and 4B will be provided.

Figure 4E:
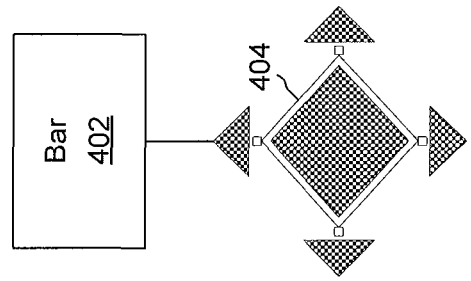
FIG. 4E illustrates portions of changing an element type in an activity diagram.
Figure 4D:
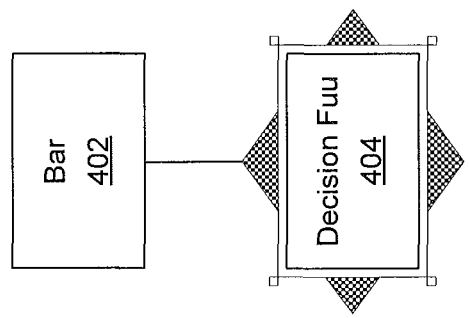
FIG. 4D illustrates portions of changing an element type in an activity diagram.
Figure 4C:
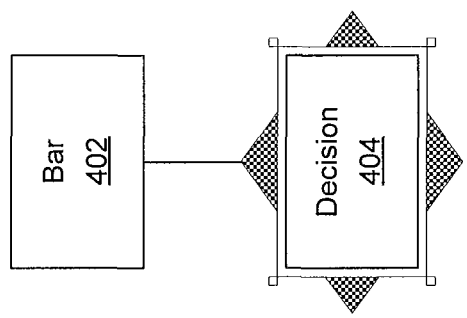
FIG. 4C illustrates portions of changing an element type in an activity diagram.

As noted, the user may wish to change the type of the element to decision, and so hits the Tab key and this automatically completes the word as illustrated in FIG. 4C. The user then adds the name of the shape, Fuu in this example as illustrated in FIG. 4D, and hits Return or Enter. At this point the shape is converted to a decision shape as illustrated in FIG. 4E.

Alternative gestures may be used for type selection. For example, if the user prefers using the mouse, the user may instead invoke a type selection command by clicking on the shape and using the scroll wheel of the mouse to scroll through the set of available types for this context.

Embodiments may also be implemented with even simpler functionality. For example a system could be built using an autocomplete system, like in word processors, where entering mnemonics such as d for Decision, a for Action etc would allow the user to change the type of an element by typing in "d<name>" and then have it automatically interpreted as "Decision <Name>" and the type changed accordingly. Some such embodiments may also include functionality for displaying a preview of what new elements would look like on the graph. For example, when a user types "d" and before making the selection of "d" durable, a preview of a decision element may be displayed on the graph in the appropriate place to help the user in deciding whether or not the decision element is the appropriate desired type.

Link creation is often well supported with the mouse in current tools. However, many currently implemented systems have drawbacks related to when links need to be created across large distances, or the user is in the flow of editing a diagram using the keyboard.

Some embodiments allow a user to invoke a link creation tool, and then define a new links by using only the keyboard. The system uses a constrained suggestion system, such as IntelliSense, to provide the user with lists of domain specific types, directions and targets for the context as they type, allowing the user to quickly specify how the link is defined.

Figure 5A:
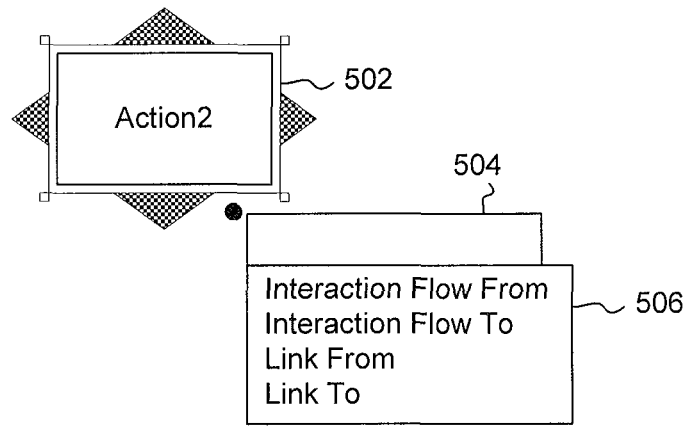
FIG. 5A illustrates portions of creating a link in an activity diagram.
Figure 5B:
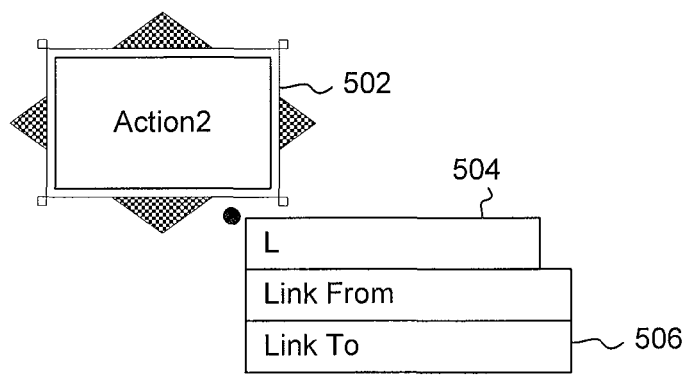
FIG. 5B illustrates portions of creating a link in an activity diagram.
Figure 5C:
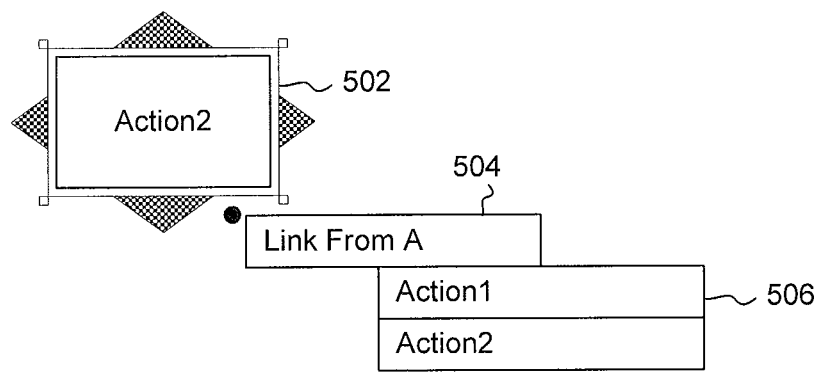
FIG. 5C illustrates portions of creating a link in an activity diagram.
Figure 5D:
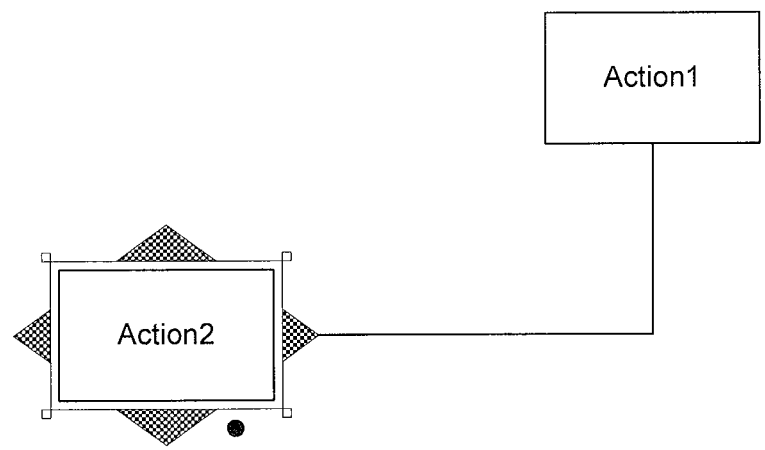
FIG. 5D illustrates portions of creating a link in an activity diagram.

Referring now to FIG. 5A, an example is illustrated. In FIG. 5A, a user invokes an "add link" command with respect to a node 502 using a gesture from a keyboard or other input device. A control 504 appears, with a domain constrained drop down 506 already expanded. As illustrated in FIG. 5B, as the user types (in this case, the letter L), the list is filtered, as usual with the domain constrained suggestions, and by pressing Tab, the user can autocomplete the selected element as illustrated in FIG. 5C. The user can now type in the type of link, the direction and which other node is being linked to/from. When the statement is complete and the user hits Enter, the link is created as illustrated by FIG. 5D.

Embodiments may further include rapid navigation of diagrams, using search and link navigation. As systems to reverse engineer diagrams from code and use them for design and analysis of code become better and more commonplace, software architecture diagrams tend to become larger, with a higher number of elements. Diagrams created using existing systems become hard to navigate as they become larger. The navigation is often based on traditional keyboard schemes to navigate lists or forms. This may be adequate when navigating to neighboring nodes in a small diagram, but often users need to either make large jumps from their current location, or they want to follow links from one node to another, even if those nodes aren't neighbors or even close to each other for that matter.

Some embodiments may overcome these challenges by implementing a system to navigate links, using principles from the system to create nodes described above. For example, embodiments may include a set of commands to navigate up, down, left, right, following links. The system will then select the first link connected to the node that goes in that direction. By issuing the same command once again, the node at the other end of the link will be selected.

If the node has multiple links connected in the direction of the command, a drop down will show up, allowing the user to select another one of the links or their target nodes wanted. Referring now to FIG. 6A, an example is illustrated. In the example illustrated in FIG. 6A, a user may wish to navigate from decision shape 602 to action3 604. The user may invoke a command to navigate link to the Right, such as for example by using gestures. In the present example, the user may use a "Ctrl-->" keyboard gesture to indicate navigation to the right. When the user invokes the command to navigate link to Right, the link to Action1 606 happens to be the first one selected. But because Action3 604 is also connected from the same side of the decision shape 602, it also shows up in the drop down 606. The user can then select Action3 604 using either keyboard or other gesture and commit to select it.

Embodiments may include functionality for navigating directly to nodes by name or other content (such as names of operations or attributes within a Class shape), using the keyboard or other hardware input devices. Embodiments may use incremental search, to use in diagrams as a way to quickly go to named elements. For example a user invokes an incremental search command. A search control shows up. As the user types, nodes which contain the current string are highlighted. As the user types more, the user can narrow down to the one node the user is seeking, and hit return. This node is now selected. Similar functionality may be applied for link labels and containers as well.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 7:
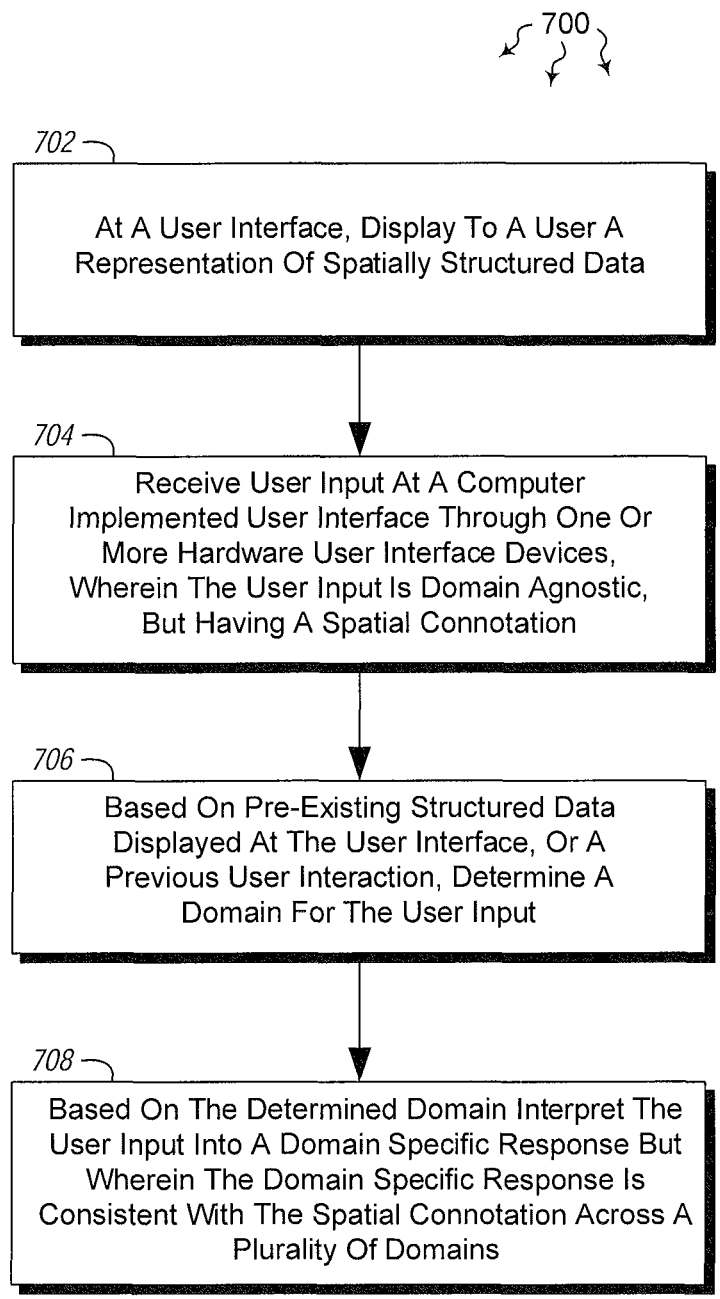
FIG. 7 illustrates a method of a method of organizing data wherein the data has spatial significance.

Referring now to FIG. 7, a method 700 is illustrated. The method 700 may be practiced in a computing environment and includes acts for organizing data where the data has spatial significance. For example, graphs and diagrams are one example of data having spatial significance. The position of nodes with respect to each other and/or connectors connecting nodes help to define the meaning of data represented by the nodes. Other data with spatial significance may include hierarchical data where spatial positioning indicates position in a hierarchy. Such hierarchical data may be included in databases, tables, etc. While not enumerated here, still other types of data may have spatial significance, and the examples here are not intended to be comprehensive.

The method 700 includes at a user interface, displaying to a user a representation of spatially structured data (act 702). For example, FIG. 2A illustrates a user interface display displaying a class diagram with class nodes 202 and 204 where the nodes 202 and 204 represent spatially structured data. FIG. 3B illustrates a user interface with an activity diagram with an action node 302 and an action node 310 connected by a flow connector where the spatial significance indicates action orders.

The method 700 further includes receiving user input at a computer implemented user interface through one or more hardware user interface devices (act 704). The user input is domain agnostic, but has a spatial connotation. For example, as illustrated above, spatial connotations may be above, below, to the right, to the left, and inside. These have spatial connotations but may differ slightly between specific domains and/or contexts. As illustrated above, the user input may be one or more of a number of different types of inputs. The examples illustrated herein are not limiting, but include mouse, pen, touch, multitouch, gestures, human limb or extremity gestures as tracked by a camera or handheld controller, controller or computing system movement flick gestures as tracked by an accelerometer in the controller or computing system, or some other user input.

The method 700 further includes based on pre-existing structured data displayed at the user interface or previous user interaction, determining a domain for the user input (act 706). For example, in FIG. 2A, the existence of a class node 202 may indicate that the domain is a class diagram. In FIG. 3A, the existence of an action node 302 may indicate that the domain is an activity diagram. Alternatively, previously entered user preferences or user's previous diagram construction actions may be used to determine the domain for the user input.

The method 700 further includes based on the determined domain interpreting the user input into a domain specific response (act 708) but wherein the domain specific response is consistent with the spatial connotation across a plurality of domains. For example in FIG. 2B, pressing the Enter key causes a new inherited class 206 to be placed below the Animal class node 202. Whereas in FIG. 3B, pressing the Enter key causes a new action node 310 to be placed below the action node 302. Thus, while in either domain, the spatial connotation is a creation below, each as a domain specific response as to what is created below.

Embodiments of the method 700 may be practiced where receiving user input includes receiving user input generated with the assistance of a hinting module that provides one or more constrained hints. For example, FIG. 5A-5D illustrates an example where a gesture is used and a hinting module provides constrained hints. Hints may be constrained based on the domain and/or the context. For example, hints may be constrained based on what type of diagram is being created and what entities are in focus in the diagram.

Embodiments of the method 700 may be practiced where receiving user input includes receiving user input generated with the assistance of a mnemonics module that provides one or more constrained hints. FIGS. 4A and 4B illustrate how a mnemonics module can be used to determine the type of a block.

The method 700 may further include as a result of interpreting the user input into a domain specific response; automatically adding a new data typed object to the spatially structured data. For example in FIGS. 3A and 3B, because the diagram is an activity diagram, an action block is automatically added. Some embodiments may include changing the type of the added new data type using at least one of a mouse button or scrolling functionality. For example, a user can select a newly added data type, and scroll through various available data types. For example, a user may be able to change an action data type added automatically to a decision data type. In some embodiments, changing the type of the added new data type may be performed using user input generated with the assistance of a mnemonics module that provides one or more constrained hints. In yet another alternative embodiment, changing the type of the added new data type may be done using user input generated with the assistance of a hinting module that provides one or more constrained hints, such as IntelliSense.

Embodiments of the method 700 may further include creating links between structured data object using user input generated with the assistance of a hinting module that provides one or more constrained hints. For example, FIGS. 5A-5D specifically illustrate an example where a link is created using a hinting module. These links can actually be fairly complex. For example, embodiments may pick one class A and use a keyboard gesture to connect it to a class B. This could result in a series of intermediate classes and links that need to be generated to correctly identify how Class A and class B are related. For example, these two classes may need to be connected through intermediaries classes C, D, and E. Nonetheless, embodiments can provide appropriate hints and make the appropriate links.

Embodiments of the method 700 may be practiced where the spatially structured data includes data having a visually observable and significant spatial layout. For example, flowcharts, Activity diagrams and the like have a layout that can be observed visually by a user.

Figure 6:
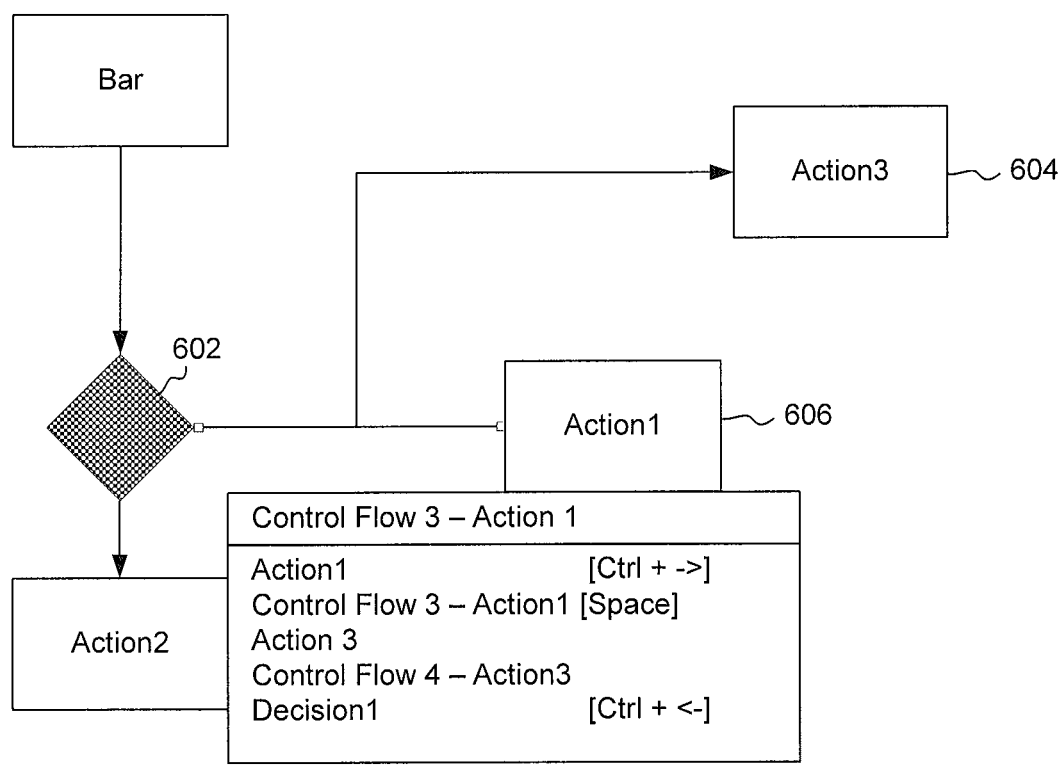
FIG. 6 illustrates navigating an activity diagram.

Embodiments of the method 700 may receiving user input for navigating links between data objects in the representation of spatially structured data. For example, as shown in the example illustrated in FIG. 6, user gestures can be used to navigate through a diagram. In some embodiments, such as is illustrated in FIG. 6, a user may be provided with a constrained list of possible navigation destinations based on the domain.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also) include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, implemented at a computer system that includes one or more processors, of organizing data wherein the data has spatial significance, the method comprising:
at a user interface, displaying to a user a representation of spatially structured data which includes one or more displayed objects; at the user interface, indicating that a particular object included in the spatially structured data has been selected, including displaying a plurality of directional user interface controls, including (i) a first user interface control above the particular object indicating that an up directional user input associated with the particular object can be received, (ii) a second user interface control below the particular object indicating that a down directional user input associated with the particular object can be received, (iii) a third user interface control to the left of the particular object indicating that a left directional user input associated with the particular object can be received, and (iv) a fourth user interface control to the right of the particular object indicating that a right directional user input associated with the particular object can be received;
receiving a directional user input through one or more hardware input devices that is associated with the particular object, the directional user input being selected from among an up direction, a down direction, a left direction, and a right direction;
based on receiving the directional user input, determining a domain type of the particular object; and
based on the determined domain type of the particular object, interpreting the directional user input to add a new object to the spatially structured data in association with the particular object, wherein:
if the domain type is a first domain type, the type of the new object is selected from within a first plurality of object types that are associated with the first domain type, and the type of the new object is further selected from among the first plurality of object types based on the particular direction of the directional user input, at least two different directions being associated with different object types in the first plurality of object types; and
if the domain type is a second domain type, the type of the new object is selected from within a second plurality of object types that are different from the first plurality of object types that are associated with the second domain type, and the type of the new object is further selected from among the second plurality of object types based on the particular direction of the directional user input, at least two different directions being associated with different object types in the second plurality of object types.

2. The method of claim 1, further comprising additional receiving user input generated with the assistance of a hinting module that provides one or more constrained hints.

3. The method of claim 2, wherein the hints are constrained based on the type of the particular object.

4. The method of claim 2, wherein the hints are constrained based on context.

5. The method of claim 1, further comprising receiving additional user input generated with the assistance of a mnemonics module that provides one or more constrained hints.

6. The method of claim 1, further comprising changing a default type of data within the new object to a new type using a mouse scroll mechanism, wherein activation of the mouse scroll mechanism causes a filtered list of types to be displayed and receiving a user selection of the new type from the displayed types in the filtered list.

7. The method of claim 1, further comprising changing a default type of data within the new object to a new type using user input generated with the assistance of a mnemonics module that causes the new type to be selected from a filtered list of types in response to detecting a typed character.

8. The method of claim 1, further comprising changing a default type of data within the new object to a new type using user input generated with the assistance of a hinting module that causes a filtered list of types to be displayed in response to detecting a typed character and receiving a user selection of the new type from the filtered list of types.

9. The method of claim 1, further comprising creating one or more links between the particular object and the new object using user input generated with the assistance of a hinting module that provides one or more constrained hints.

10. The method of claim 1, wherein the spatially structured data comprises data having a visually observable spatial layout.

11. The method of claim 1, further comprising receiving additional user input for navigating links between data objects in the representation of spatially structured data.

12. The method of claim 11, further comprising displaying a constrained list of possible navigation destinations based on the domain type the particular object in response to detecting a plurality of different navigation destinations in a particular direction identified by received navigation input.

13. A computer system, comprising:
one or more hardware processors;
a display device;
one or more hardware input devices; and
one or more computer readable hardware storage devices comprising computer executable instructions that are executable by the one or more hardware processors to configure the computer system to organize data wherein the data has spatial significance, including computer executable instructions that are executable to configure the computer system to perform at least the following:
display, at a user interface on the display device, a representation of spatially structured data which includes one or more displayed objects;
at the user interface, indicate that a particular object included in the spatially structured data has been selected, including displaying a plurality of directional user interface controls, including (i) a first user interface control above the particular object indicating that an up directional user input associated with the particular object can be received, (ii) a second user interface control below the particular object indicating that a down directional user input associated with the particular object can be received, (iii) a third user interface control to the left of the particular object indicating that a left directional user input associated with the particular object can be received, and (iv) a fourth user interface control to the right of the particular object indicating that a right directional user input associated with the particular object can be received;
receive a directional user input through the one or more hardware input devices that is associated with the particular object, the directional user input being selected from among an up direction, a down direction, a left direction, and a right direction;
based on receiving the directional user input, determine a domain type of the particular object; and
based on the determined domain type of the particular object, interpret the directional user input to add a new object to the spatially structured data in association with the particular object, wherein:
if the domain type is a first domain type, the type of the new object is selected from within a first plurality of object types that are associated with the first domain type, and the type of the new object is further selected by the one or more hardware processors from among the first plurality of object types based on the particular direction of the directional user input, at least two different directions being associated with different object types in the first plurality of object types; and
if the domain type is a second domain type, the type of the new object is selected from within a second plurality of object types that are different from the first plurality of object types that are associated with the second domain type, and the type of the new object is further selected by the one or more hardware processors from among the second plurality of object types based on the particular direction of the directional user input, at least two different directions being associated with different object types in the second plurality of object types.

14. The computer system of claim 13, also including computer executable instructions that are executable to configure the computer system to receive additional user input generated with the assistance of a hinting module that provides one or more constrained hints.

15. The computer system of claim 14, wherein the hints are constrained based on the type of the particular object.

16. The computer system of claim 14, wherein the hints are constrained based on context.

17. The computer system of claim 13, also including computer executable instructions that are executable to configure the computer system to receive additional user input generated with the assistance of a mnemonics module that provides one or more constrained hints.

18. A computer program product comprising one or more computer readable hardware storage devices comprising computer executable instructions that are executable by one or more processors to configure a computer system to organize data wherein the data has spatial significance, including computer executable instructions that are executable to configure the computer system to perform at least the following:
at a user interface, display to a user a representation of spatially structured data structured in a visually observable spatial layout which includes one or more displayed objects;
at the user interface, indicate that a particular object included in the spatially structured data has been selected, including displaying a plurality of directional user interface controls, including (i) a first user interface control above the particular object indicating that an up directional user input associated with the particular object can be received, (ii) a second user interface control below the particular object indicating that a down directional user input associated with the particular object can be received, (iii) a third user interface control to the left of the particular object indicating that a left directional user input associated with the particular object can be received, and (iv) a fourth user interface control to the right of the particular object indicating that a right directional user input associated with the particular object can be received;
receive a directional user input through one or more hardware input devices that is associated with the particular object, the directional user input being selected from among an up direction, a down direction, a left direction, and a right direction;
based on receiving the directional user input, determine a domain type of the particular object; and
based on the determined domain type, interpret the directional user input to add a new object to the spatially structured data in association with the particular object, wherein:
if the domain type is a first domain type, the type of the new object is selected from within a first plurality of object types that are associated with the first domain type, and the type of the new object is further selected from among the first plurality of object types based on the particular direction of the directional user input, at least two different directions being associated with different object types in the first plurality of object types; and
if the domain type is a second domain type, the type of the new object is selected from within a second plurality of object types that are different from the first plurality of object types that are associated with the second domain type, and the type of the new object is further selected from among the second plurality of object types based on the particular direction of the directional user input, at least two different directions being associated with different object types in the second plurality of object types.

19. The computer system of claim 13, wherein the new object inherits at least one property from the particular object.

20. The computer system of claim 13, wherein the new object is a parent or a child of the particular object.

* * * * *